3,360,440
COLD WATER RECONSTITUTABLE MICROBIO-
LOGICAL MEDIUM, PROCESS FOR PREPARA-
TION AND USE, AND PRODUCT
Walter Haab, Dutch Hill Road, Canadensis, Pa. 18325,
and Martin D. Appleton, 209 Claremont Ave., Clarks
Summit, Pa. 18411
Filed Apr. 13, 1966, Ser. No. 542,382
26 Claims. (Cl. 195—100)

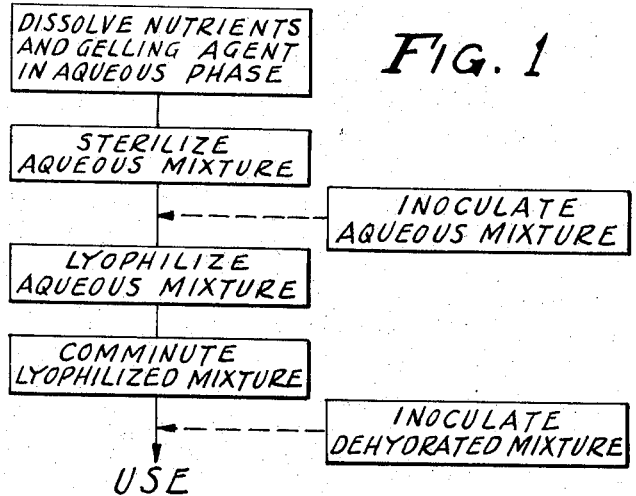
FIG. 1 PREPARATION
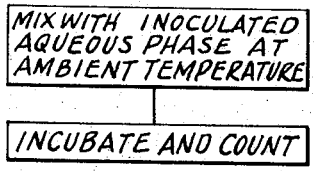
FIG. 2
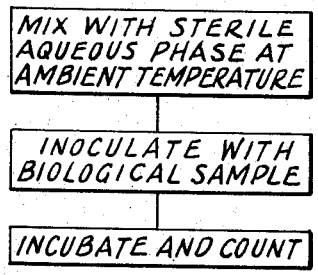
FIG. 3
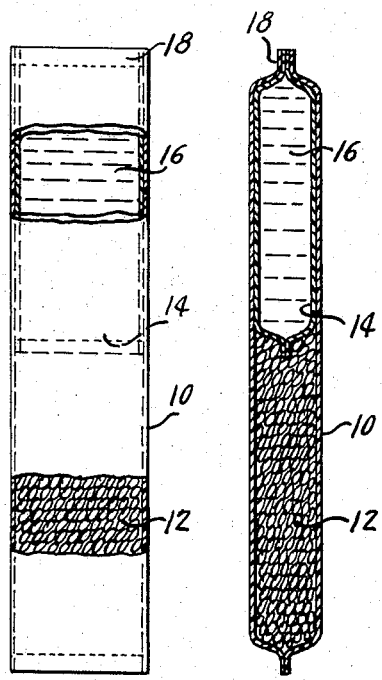
FIG. 4  FIG. 4A
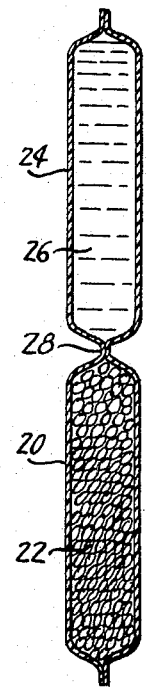
FIG. 5
INVENTORS.
WALTER HAAB
MARTIN D. APPLETON United States Patent Office 3,360,440
Patented Dec. 26, 1967

This is a continuation-in-part application of application Ser. No. 310,462, filed Sept. 20, 1963, now abandoned, Microbiological Medium and Process for Preparing the Same.

This invention relates to a microbiological medium which is reconstitutable in water, or other aqueous media, at ambient temperature to produce a microbiological hydrogel medium. The invention relates to a process for preparing a reconstitutable microbiological medium having the property of being rehydratable in an aqueous phase at approximately room temperature and to the product itself and to an article of manufacture encompassing the inventive concept of the properties of the composition of matter.

This invention further relates to a reconstitutable microbiological hydrogel medium capable of conversion to a medium of desired rigidity by addition of an aqueous phase and which includes as a component thereof dormant forms of chosen microorganisms as a constituent of the reconstitutable microbiological medium.

As conducive to a better understanding of the instant invention it should be understood that when a testing program involving microbiological assay has been devised, and that testing program is dependent upon an absolutely uniform medium, that is to be inoculated with a specific microorganism such as a specific strain of bacteria, mold, fungi or spores or other dormant forms thereof, as well as specific strains of viruses and rickettsiae, it is usual for the criteria of positivity or negativity of the test to be dependent upon a simple growth response of the inoculated organism.

Certain microorganisms may undergo mutation or adaptation to adverse conditions which may be of such a nature as to render the result of the testing program involving such microorganisms invalid. It is well known that in many bacteriological tests, growth response is dependent upon the utilization by the organism of the components of the medium. A mutant or adapted strain of organisms may not have the same growth requirements as the strain initially selected for the test. Many bacteria or spores thereof as well as other microorganisms can be stored in the lyophilized form for relatively long periods of time without loss of vitality. Such storage may eliminate the necessity of repeated propagation of the microorganisms, and thus reduce the chance of mutations.

Conventional bacteriological analysis does not readily lend itself to mass testing programs. This is partly because of the technical "know-how" required on the part of the operator and partly because of the equipment necessary to prepare the media, to sterilize the media, and to inoculate the media with microorganisms.

Media for the culturing of microorganisms have been commonly prepared heretofore by dispersing either agar-agar or gelatin as a solidifying or gelling agent in an aqueous solution containing the constituents necessary to the preparation of a definite microbiological medium. Agar-agar and gelatin are purified natural products and very frequently contain minute quantities of growth-promoting substances in nonuniform concentration. Thus, adequate control of the testing procedure is difficult or impossible. Further, the processing of solid media utilizing agar-agar or gelatin as a gelling agent requires heating the aqueous phase in order to produce a homogeneous gel.

The use of certain polyacrylamides as gelling agents in the preparation of a microbiological medium has been suggested in Patent No. 3,046,201, issued July 24, 1962. While such a synthetic offers certain advantages over the more conventional agar-agar and gelatin, various difficulties still persist. For example, gel formation with a polyacrylamide necessitates a chemical reaction adding to the many variables already inherent in the process. Also, gels formed utilizing a polyacrylamide are not easily lyophilized and rehydrated or reconstituted. Furthermore, specific pH control is necessary for the gelation of polyacrylamides and the polymersize of the resin will control the viscosity of the gel.

It is an object of this invention to provide a microbiological medium having the property and characteristic of being rehydratable at approximately room temperature, at a temperature below the temperature required to rehydrate agar, to provide a microbiological hydrogel medium.

It is an additional object of this invention to provide a process for producing microbiological media in large quantities for mass testing which will have uniform properties and which will react uniformly to the application of selected biological samples.

Another object of this invention is the provision of a reconstitutable microbiological hydrogel medium which may be readily converted to a medium of desired rigidity by the addition of an aqueous phase at a temperature less than the temperature required to hydrate agar, preferably at an ambient or ordinary room temperature.

A further object of this invention is to provide a gelling agent for microbiological media which contains no substances detrimental to adequate control of a testing program.

A further object of the instant invention is to provide a reconstitutable microbiological medium containing selected or chosen microorganisms which may be stored for extended periods of time without loss of vitality and which may be utilized to produce a definite and reproduceable culture medium at desired intervals.

An additional object of this invention is to provide such a medium having a coloring agent incorporated thereinto to facilitate visual identification and a growth recognition of the chosen microorganisms.

An additional object of this invention is to provide a room temperature reconstitutable hydrogel medium including therein a coloring agent inert to selected microorganisms which may be present therein or which may be added subsequently.

Yet another object of the invention is to provide a reconstitutable hydrogel bacteriological medium homogeneously inoculated with specific quantities and forms of microorganisms for later rehydration to produce a culture medium with desired rigidity.

Another object of the instant invention is to provide a reconstitutable microbiological medium homogeneously inoculated with pure strains of chosen microorganisms for the purpose of using the mixture as a starting culture in food and fermenting industries.

An additional object of this invention is the provision of a process for preparing reconstitutable microbiological medium by the addition of a modified cellulose gelling agent to an aqueous solution of constituents required for the preparation of a definite microbiological medium, followed by the removal of water in the so-formed intermixture by a lyophilization procedure to produce a viable material which is subsequently comminuted.

Yet another object of this invention is the provision of a procedure for the preparation of a reconstitutable microbiological medium by the addition of a modified cellulose gelling agent, which is soluble in water at ambient temperature, to a substantially dry combination of constituents required for the preparation of a definite biological medium, with the intermixture being homogeneously combined and comminuted for later use.

Still another object of the instant invention is the provision of a process for preparing a reconstitutable microbiological medium by the addition of a modified cellulose gelling agent to an aqueous solution of constituents required for the preparation of a definite microbiological medium, followed by the removal of the water in the so formed intermixture by a lyophilization procedure to produce a friable material which is subsequently comminuted and the inoculation of the dehydrated comminuted material with dormant forms of chosen microorganisms for subsequent rehydration and use.

It is a further object of this invention to provide a process for preparing and using a reconstituted hydrated microbiological medium containing only selected viable microorganisms by rehydrating a dry medium by merely adding a cold aqueous phase and treating the reconstituted medium with the desired biological sample to yield a visible growth in the medium in response to a component of the sample.

It is a still further object of this invention to provide a process for preparing and using a microbiological hydrogel medium by rehydrating a dry medium merely by the addition of a cold aqueous phase and treating the reconstituted medium with the desired biological sample to yield a visible growth in the medium in response to a component of the sample.

It is an additional object of this invention to provide a reconstituted hydrogel microbiological medium containing any coloring agent which is inert to selected microorganisms.

It is a further object of this invention to provide an article of manufacture including a rehydratable microbiological medium and a selected aqueous phase which may be shipped, stored, and handled for any desired length of time and may be reconstituted at a desired time but with no special precautions regarding sterilization or sterile techniques.

Specifically, it is a further object of this invention to provide an article of manufacture comprising at least two containers, a rehydratable microbiological medium and a desired aqueous phase.

Other objects of this invention will become apparent from the following specification and drawings to which reference is made.

FIGURE 1 is a diagrammatic sketch of the process of preparation of the microbiological medium of this invention.

FIGURE 2 is a diagrammatical sketch of a process of using the product of this invention.

FIGURE 3 is a diagrammatical sketch of a second method for using the product of this invention.

FIGURE 4 is an article of manufacture in which the composition of matter of this invention is incorporated for use. FIGURE 4a is a side view of the invention of FIGURE 4.

FIGURE 5 is a variation of the invention of FIGURE 4.

The composition of matter of this invention is comprised basically of the constituents conventionally required for the preparation of a definite microbiological medium homogeneously intermixed with a gelling agent which consists of a cold water soluble modified cellulose.

In particular, the sole functioning gelling agent of the composition of the matter may be a modified cellulose of the formula

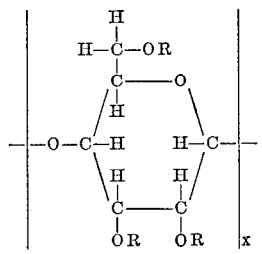

wherein R is a radical selected from the group consisting of carboxymethyl, hydroxyethyl, carboxymethyl-hydroxyethyl, alkali metal salts of carboxymethyl, hydroxyethyl and carboxymethyl-hydroxyethyl, and hydrogen. Specific gelling agents found useful are carboxymethyl cellulose, the hydroxyethyl ether of cellulose, and the soduim salt of carboxymethyl-hydroxyethyl cellulose, however, the sodium, potassium or lithium salts of each of the above materials are suitable since they are all soluble in an aqueous system.

The term "sole functional gelling agent" as is used in this specification and in the appended claims means that the only constituent of the composition of matter which has a significant function as a gelling agent is a modified cellulose. This would exclude agar as a functional gelling agent; however, just as minor traces of impurities of, for example, sand, would not necessarily interfere with the functioning of the composition of matter of this invention, minor and insignificant, or inoperative, amounts of agar or other gelling agents could be present in the composition of matter if they were not present in such quantities and in such forms as to be detrimental to the advantageous properties of the composition of matter which will be described hereinafter. The term "cold water soluble" as used in this specification and in the appended claims has reference particularly to the temperature below which agar can normally be hydrated. Agar is usually rehydrated from its rehydrated state at a temperature of about 100° in water. Therefore the term "cold water," in its normal application, would cover the range from about 20°, or less if desired, to about 100° or such lower temperature as an interfering gelling agent, for example, agar, would not hydrate. Another limitation on the term "cold water soluble" has to do with the upper limit at which certain heat sensitive microorganisms may lose their viability. Thus, "cold water" refers to water in the range of approximately 20° to approximately 90 to 100°. Of course, in its most convenient usage it may be reconstituted at ambient or room temperature.

The constituents necessary to the preparation of a definite microbiological medium include various nutritive elements which normally consist of salts or various types, together with minute quantities of amino acids, vitamins or the like. Specifically, such inorganic salts as the phosphates and chlorides of the alkali and alkali earth metals in addition to trace minerals in salt form such as copper, cobalt, iron and the like would be incorporated. Further, organic constituents such as sugars or other carbohydrates, anti-metabolites (i.e., thionylphenylalanine for phenylalanine or sulfonamide for para-aminobenzoic acid) would be utilized in the medium. Also, antibiotics such as benzyl penicillin might be incorporated. The specific constituents of a microbiological medium would depend upon the particular microorganisms being cultivated and it is to be understood that the above materials are only illustrative and not limiting.

The microbiological medium of the instant invention may also be inoculated with one or a variety of microorganisms or spores thereof to provide a stable microbiological culture in a relatively anhydrous state capable of being stored indefinitely and reconstituted at room temperature with sterile distilled water. A combination of molds, fungi, bacteria, rickettsiae, viruses or spores or other dormant forms thereof may be utilized.

Additionally, a coloring means or dyestuff may be incorporated into the microbiological medium since the medium, either with or without contained microorganisms, is clear and colorless as opposed to agar-agar media prepared by conventional prior art methods. Exemplary of such dyestuffs are the triphenylmethane dyes such as malachite green, fuchsine, or pararosaniline crystal violet, the azo dyes such as aniline yellow, Bismarck brown, Congo red, fast red AV, Carmoisine, Carmoisine 1, Resorcine brown, or Naphthol blue black, the indigo dyes such as Tyrian purple, indigo, thioindigo, Indanthrene red violet RH, or Ciba green G, and the quinonoid dyes such as Alizarine blue black B, Indanthrone, Pyranthrone, Violanthrone, Caledon yellow 4G, or Sufranol blue GG. Other classes of dyestuffs could be utilized, but in all cases the specific coloring means will be dependent upon the microorganism used because of toxicity factors.

According to one procedure for preparing the microbiological medium of the instant invention, a quantity of one or a mixture of the above mentioned modified cellulosic gelling agents of from about 1 to about 50 percent is dispersed in an aqueous system containing the nutritive elements of the media, preferably at room temperature. This aqueous intermixture may then be sterilized and subsequently cooled and lyophilized or gently foamed with a sterile inert gas such as nitrogen or helium, or air and at the same time lyophilized at low temperatures until a friable material is obtained. The friable material is then comminuted by milling or the like in sterile equipment to provide a powdery substance of substantially constant particle size which is packaged under sterile conditions either in bulk or in preweighed portion which will reconstitute at room temperature with the addition of an aqueous phase such as sterile distilled water to form a definite quantity of microbiological medium of desired rigidity. The range of gelling agent of from about 1 to about 50 percent of the aqueous intermixture is set in that below about 1 percent the medium will not gel and above about 50 percent the material becomes insoluble.

The sterilization procedure is conventional and is carried out at about 121° C. and 15 p.s.i. for about 20 minutes, these variable being maintained to avoid hydrolysis of the gel former.

The lyophilization procedure is also conventional and consists of removing water from frozen materials at reduced pressure. In the final stages of lyophilization this pressure is usually less than one millimeter of mercury. The freezing of the material can be accomplished by means of Dry Ice or a mixture of Dry Ice with methyl alcohol or acetone. The final moisture content of the material may be as low as a fraction of one percent or as high as 20 percent, depending on the desired extent of lyophilization.

The aqueous intermixture may be inoculated with various microorganisms prior to the lyophilization procedure. Spores generally lose relatively little of their viability during lyophilization and vegetative forms of microorganisms will be affected to various degrees during lyophilization whereby, among other factors, the speed of freezing may be of importance. The lyophilization procedure can be adapted to the individual needs of the microorganism to protect its expected viability upon rehydration of the medium, with lyophilization preferably being carried out at low temperatures. The product obtained by this procedure consists of a stable microbiological culture in a dehydrated or reconstitutable state capable of being stored indefinitely and converted to a culture of desired rigidity by addition of an aqueous phase.

The composition of matter of the instant invention may also be prepared by dry milling to a homogeneous particle size one, or a combination of, the above modified cellulosic gelling agents with the constituents necessary to the preparation of a definite microbiological medium followed by a dry sterilization of the intermixture in a hot gas at a temperature of approximately 150° C. for approximately 1 hour. The browning range for the gel formers is above 200° C. and unless it is charred there will be no loss in water solubility.

Media prepared by dry milling and dry sterilization can be packaged in bulk under sterile conditions or can be preweighed into individual portions for reconstitution as such to insure the presence of all constituents in the correct proportions.

If desired, lyophilized microorganisms or dormant forms thereof may be added to the medium by inoculation in order to provide a stable microbiological culture for reconstitution by the addition of an aqueous phase.

A coloring means or dyestuff may be incorporated into the microbiological medium as explained hereinbefore to visually identify media and an organism containing media. Such a means of identification may obviate the necessity of using tags, numbers, or other such means. It has also been found that the addition of coloring agents to cultures or media may facilitate visual recognition of growth in that a background contrast is built into the media and the growth response is readily seen thereagainst.

A working example for preparing a lyophilized culture medium according to the instant inventive concept is as follows: The medium consisted of the following ingredients:

| | Gm. |
|---|---|
| $K_2HPO_4$ | 30.0 |
| $KH_2PO_4$ | 10.0 |
| $NH_4Cl$ | 5.0 |
| $NH_4NO_3$ | 1.0 |
| $Na_2SO_3$ | 1.0 |
| L-glutamic acid | 1.0 |
| L-asparagine | 1.0 |
| L-alanine | 0.5 |
| Dextrose | 10.0 |
| $MgSO_4 \cdot 7H_2O$ | 0.1 |
| $MnCl_2 \cdot 4H_2O$ | 0.01 |
| $FeCl_2 \cdot 6H_2O$ | 0.01 |
| $CaCl_2$ | 0.005 |

These ingredients were weighed out and placed into a 1,000 ml. beaker. Five hundred milliliters of doubly distilled water were added and the mixture was heated to the boiling point to hasten solution. The solution was placed into a 1,000 ml. volumetric flask and diluted to 1 liter following which two 500 ml. portions were measured out, each portion being placed into a two-piece 1,000 ml. freeze-drying flask. Adapters were fitted to the flasks and plugged with cotton. The flasks were then placed in an autoclave and sterilized at approximately 15 p.s.i. for about 20 minutes at a temperature of approximately 121° C.

When the flasks and their contents had cooled after being removed from the autoclave, 0.5 ml. of spore suspension of *Bacillus subtilis* ATCC 6051 having an optical density of 0.9 were added to each. Also added were 0.5 ml. of 0.01 M β-2-thienylalanine. Seventy grams of the hydroxyethyl ether of cellulose were added to each flask and the contents stirred vigorously. The gels which were formed were allowed to set overnight to assure uniform distribution of liquid throughout the gel.

Lyophilization was carried out with a conventional freeze-dryer utilizing flasks which could be dismantled for the convenient removal of material. A pressure of less than 1 mm. of mercury was indicated by a manometer of terminal stages. Temperature was below −50° C. during entering period of lyophilization. Lyophilization was continued for from about 60 to 80 hours.

The lyophilized culture was then partly crushed with a mallet and subsequently mechanically ground in an electric coffee mill. The mallet, the steel trough in which crushing was done, and the mechanical mill were sterilized before use in an autoclave at about 15 p.s.i. for approximately 20 minutes. The motor of the mill was protected from the steam by an envelope of heat-resistant plastic. The granulated culture was stored in sterile Erlenmeyer flasks stoppered with cotton.

Two months later, the lyophilized, granulated culture was hydrated in the proportion of 14 grams of culture to 100 ml. of water. The pH was checked at 6.8.

This reconstituted or hydrated spore-containing medium was utilized for the bio-assay of phenylalanine contained in blood samples placed on this medium. A certain level of phenylalanine present in the blood caused the spores contained in the medium to germinate and yield a visible growth.

Of course it will be realized that the reconstituted hydrogel medium, which may or may not contain viable microorganisms, may be inoculated with any selected biological sample. The above example, however, illustrates one of the most important and valuable aspects of this invention as shown by the publications, "A Modification of the Guthrie Test for Phenylketonuria," Proceedings of the Pennsylvania Academy of Science, vol. 37, 1963, by Drs. Haab, Appleton and Fanucci, and "Validation of a Modification of the Guthrie Test for Phenylketonuria," by Drs. Haab, Appleton, Duch and Murray. These publications describe but one application of the concept embodied in the invention. Previous to the invention disclosed it was necessary to send the blood samples to remote laboratories in order to have the described tests performed. In addition to the obvious problems of handling, there is a very serious problem of delay in the return of the results of the tests. By using the composition of this invention, and taking advantages of its particular properties, it is possible for every small laboratory to perform the test, it is even possible for the doctor having very minimal laboratory facilities to perform the test on the spot. In the United States this particular feature is less important than it is in underdeveloped countries where the nearest laboratory may be many hundreds of miles from the doctor and from the patient. In such cases, the composition of matter makes possible the performance not only of the tests described in these publications but many others on the spot by one who has either very little training or by the doctor himself. In terms of economy, the bulk preparation of microbiological media having perfectly uniform characteristics for mass testing of children is made possible by the invention. Many states, including Pennsylvania and New York, now require that every child be given the Guthrie test for phenylketonuria. The advantages of a readily available source of perfectly uniform test samples is apparent. These advantages are now, and no doubt have been for many years or generations, recognized by the medical profession; however, it has not heretofore been suggested that these and other similar tests could be performed in this manner. The composition of matter of this invention is especially important because until the present invention it was impossible to prepare a microbiological medium which could be reconstituted at room temperature and which when hydrated would include viable heat sensitive microorganisms.

In addition to the method of preparation previously described, the nutrients and the gelling agent may be dissolved in an aqueous phase which then may be sterilized and subsequently lyophilized to form a dry mixture which is comminuted. It is possible then to inoculate the dry comminuted mixture with dormant forms of selected microorganisms for subsequent storage of shipment prior to its use.

To summarize the invention thus far, reference is now made to FIGURE 1 which describes the steps in the preparation of the composition of matter of this invention. The selected nutrients which are chosen in reference to the particular forms of microorganisms which may be inoculated in the medium, and the gelling agent as previously described with reference to the specific example are dissolved in an aqueous phase. The mixture is then sterilized. Following sterilization the aqueous mixture may be inoculated if desired, with selected microorganisms. It is, of course, not necessary to the invention that this inoculation take place at this stage. The next step is to lyophilize the aqueous mixture to form a friable dehydrated composition of matter having the characteristics and advantages of this invention. The friable composition is then comminuted to make it more readily rehydratable to form the desired hydrogel microbiological medium. It is possible, in one form of the process, to inoculate the dehydrated mixture with a pure strain or with any chosen microorganisms in a dormant form. The composition may then be stored or transported as is desired prior to its reconstitution and use.

FIGURE 2 shows a first method of using the composition of this invention. The diagram illustrates the extreme simplicity of the process; all that is necessary is that the composition of matter be mixed with an inoculated aqueous phase at ambient temperature. The hydrogel then may be incubated and counted in the normal manner as described by Pelczar and Reid, "Microbiology," McGraw-Hill Publishing Company, New York, and by other standard textbooks on the subject.

The second use involves the inoculation of the hydrogel microbiological medium subsequent to its reconstitution. In this process the composition of matter is mixed with a sterile aqueous phase at ambient temperature and allowed to hydrate. The hydrated mixture is then inoculated with a desired biological sample and then incubated and counted in the conventional manner.

It should be observed that the addition of a coloring agent which is inert to the microbiological growths is of considerable importance in counting since, unlike agar which is cloudy, the microbiological medium of this invention is clear. This clarity, combined with a suitable background color, serves not only to identify the particular medium but to provide for easier and more accurate counting.

An additional facet of this invention is described with reference to FIGURES 4 and 5. In FIGURE 4, a first container 10 is provided in which the composition of matter 12 described previously is contained. Also contained within the first container is a second container 14 which contains within it an aqueous phase 16, in a normal embodiment of the invention, sterile water. The first and second containers 10 and 14 are secured by means 18 securing the second container to the first container in normally noncommunicating relationship therewith. The containers are selected so that the means is selectively openable, that is, upon compressing the outer wall of container 10 and consequently container 14, the container 14 will open permitting the aqueous phase 16 and the composition of matter to mix to form a microbiological hydrogel medium.

FIGURE 5 shows a slight variation of this concept. In FIGURE 5 the first container 20 includes the composition of matter 22 while the second container 24 includes the aqueous phase 26. Containers 20 and 24 are secured by an openable means 28. When container 24 is compressed, securing means 28 opens permitting the mixing of the two ingredients to form a hydrogel microbiological medium of desired rigidity.

Of course it is not necessary that the two containers include the structural details shown in FIGURES 4 and 5, rather the inventive concept is the provision of two containers which are in normally non-communicating relationship but which by a simple manipulation may be caused to communicate providing for the mixing of the aqueous and the dehydrated constituents. Such containers could be made of glass but in the preferred embodiment are made of a clear plastic. The selection of the plastic may be determined to some extent by the nature of the microorganisms which may be incorporated, if desired, in the composition of matter. For example, an oxygen impervious container may be selected for anaerobic microorganisms while an oxygen pervious container may be selected for aerobic microorganisms.

The microbiological test kit may also be provided with means for inoculation such as, for example, the conventional syringe caps through which a needle may be inserted.

The advantages of a clear microbiological medium, the provision of which is an object of this invention, will be apparent to those skilled in the art as will be the advantages of the microbiological testing kit.

The invention, as previously indicated, has applications in many and various areas of microbiology. In demonstration of this, the following reduction to practice has been accomplished.

It can be specified that the utilization of a culture medium capable of lyophilization and reconstitution in cold water will be effective in the detection of bacteria in water, sewage, air, food, soil and various other surfaces. For this purpose, the aforementioned media can be incorporated into a process for the determination of the standard plate count for the evaluation of the number of viable cells which will multiply under the conditions specified by the plate count in question.

In this process, a measured amount of inoculum of desired aqueous dilution is utilized to reconstitute the lyophilized previously prepared microbiological medium consisting of hydroxyethyl cellulose (or a similar water soluble cellulose derivative) and the desired nutrients. The organisms originally contained in the inoculum are now trapped in the solidified medium. Upon incubation, the organisms multiply forming viable colonies which can be counted by standard techniques. It should be noted that a process of this type is unworkable if agar is used as the gelling agent inasmuch as agar is insoluble in cold water.

The inoculum consists of:

(1) Milk sample,
(2) Sewage sample,
(3) Water sample,
(4) Food sample,
(5) Soil sample,
(6) Swab test material obtained from surfaces,
(7) Any aqueous biological sample.

The general procedures for the quantitative measurement of bacterial growth are outlined in standard textbooks dealing with microbiology. One such text is "Microbiology" by Pelczar and Reid.

Bacteria that would be involved in the above process involving the new culture media would be—

(1) Milk: Streptocci, microbacteria, micrococci, coliform bacteria, lactobacilli and the following genera Clostridium, Alcaligenes, Aerobacter, Pseudomonas, Serratia, etc.
(2) Sewage: Coliforms, streptococci, anaerobic spore forming bacilli, the Proteus group.
(3) Water: Escherichia, Sphaerotilus, Gallionella, Thiobacillus, *Desulfovibrio desulfuricans*, and Aerobacter.
(4) Food: *Bacillus subtilis, Aerobacter aerogenes, Micrococcus roseus,* Lactobacillus, Clostridium, *Pseudomonas fluorescens,* Achromobacter, Flavobacterium, Acetobacter.
(5) Soil: Antibiotic producing organisms, numerous aerobic and anaerobic bacteria.

Reference is made to such standard textbooks as: "Practical Food Microbiology and Technology," by Weiser, M. M., Avi Publishing Co., Inc., Westport, Conn., "Introduction to Soil Microbiology," by Alexander, J. Wiley & Sons.

*Determination of the microbiological content of air*

This process consists of sampling the air by the use of slit samplers, seive samplers or liquid impingement devices such as described in standard works in the field such as "Sampling Microbiological Aerosols," U.S. Public Health Service Monograph No. 60, 1959, or by the settling plate technique.

In the microbiological media used for the subsequent plate count, hydroxyethyl cellulose or other water soluble cellulose derivative is substituted for agar. The complete lyophilized medium is regenerated with water (cold) or prepared directly with cold water at the time of use. None of the above being possible with the ordinary bacteriological media prepared with agar.

In both the slit and seive samplers and settling plate techniques, the organisms are impinged upon the microbiological medium surface. Upon incubation, the plate count can then be made.

The liquid impingement devices transport air through a fluid, thus trapping organisms. The inoculum obtained can be tested as previously described.

Air organisms such as *Serratia marcescens, Bacillus subtilis,* Micrococcus and Sarcina and genera such as Cladosporium, Botrytis, Stemphylium, Penicillium, Alternaria may be evaluated by the process described in plate counts.

Additional samples include blood, serum, plasma, spinal fluid, tissues, etc., involving microorganisms such as *Clostridium tetani, Staphylococcus aureus, Clostridium botulinum, Corynebacterium diphtheriae, Streptococcus hemolyticus, Clostridium perfringens, Shigella dysenteriae* and other pathogens.

*Production (commercial or laboratory) of organisms*

The inoculation of lyophilized and cold water-regenerated hydroxyethyl cellulose or other water soluble cellulose media or the inoculation of such prepared media, without lyophilization is also claimed as a process. The purpose of such inoculation being the production of spores of other forms of microorganisms and the harvesting of the same for commercial or laboratory purposes.

In addition, the process is also included in which microorganisms are grown on hydrated hydroxyethyl cellulose medium (or medium containing other water soluble cellulose derivatives) and the resulting culture is lyophilized for the purpose of storage or shipment of the same to users.

The process of inoculation of medium with *Streptococcus thermophilus,* inoculation of culture for microbial growth and subsequent lyophilization of the culture for the purpose of using same as a starter culture in cheese making.

In addition, individual lyophilized cultures containing individual or pure strains of microorganisms may be mixed for the purpose of using the mixture as a started culture in food and fermenting industries.

A standard work in the field and applications therein is "Dairy Bacteriology," 4th edition, by B. W. Hammer and F. Bable, John Wiley & Sons, 1957.

This invention includes a process involving a microbiological plate count, utilizing a previously prepared lyophilized culture media containing hydroxyethyl cellulose or other water soluble cellulose derivatives as the gelling agent, regenerated in the cold at any temperature between approximately 20–100° C. with an appropriately diluted sample of milk, sewage, water, food, soil, swab test material, or in samples or water obtained by the liquid impingement process as the inoculum.

This invention also includes a process involving the production of pure cultures of microbiological organisms, by inoculating previously prepared lyophilized culture media, regenerated with cold water with specific microorganisms, as well as processes in which lyophilization is not carried out, as previously described.

This invention further includes the processes wherein microorganisms are grown and cultured on either regenerated, previously lyophilized culture media containing water soluble cellulosic derivatives or on hydrated medium containing such derivatives but not put through lyophilization. The resulting culture is *then* lyophilized for the purpose of storage or shipment of same to users before hydration at or about 20–100° C., wherein individual lyophilized cultures containing pure strains of microorganisms are deliberately mixed before rehydration for the purpose of utilizing the mixture as a starter culture in the food and fermentation industries and involving the specific reduction to practice with microorganisms such as Escherichia, Sphaerotilus, Gallionella, Thiobacillus, *Desulfovibrio desulfuricans,* Aerobacter, coliforms, streptococci, anaerobic spore-forming bacilli, the Proteus group, bacilli, microbacteria, micrococci, Alcaligenes, Achromobacter, antibody producing organisms, Sarcina and all genera, species and subspecies not specifically mentioned herein.

The following formulae are representative of those that can be utilized with this invention.

(1) A modification of the Standard Nutrient Agar of the American Public Health Association for the enumeration of bacteria in water and other specimens by the plate method: [1]

| | |
|---|---|
| Tryptone ($\beta,\beta$-L-Trypticase) | 5.0 |
| Beef extract | 3.0 |
| Glucose | 1.0 |
| Hydroxy ethyl cellulose | 50.0 |

Dilute to 500 ml. and allow to gel, lyophilize in a Firtis Freeze-dry system at 0° F. Comminute the resulting product under sterile conditions by mechanical grinding. Place one gram of the lyophilized powder in each petri dish, and regenerate with 15 ml. of appropriately diluted inoculum at room temperature.

(2) A Modification of McLaughlin's ("McLaughlin" J. Bact. 51: 560 (1946), Trypticase sugar agar for the Cultivation of lactobacilli used in cheese-making and yogurt production:

| | |
|---|---|
| Trypticase | 20.0 |
| Mixed amino acids | 2.5 |
| Dextrose | 5.0 |
| Lactose | 5.0 |
| Sucrose | 5.0 |
| Hydroxyethyl cellulose | 60.0 |

Suspend 100 grams of the powder in one liter of distilled water and lyophilize at 0° F. and comminute mechanically under sterile conditions.

Resuspend 10 grams of the lyophilized powder in 200 ml. of sterile distilled water to which the inoculum has been added, and allow the culture to solidify at room temperature using sterile conditions throughout.

Alternately, 10 grams of the dry ingredients may be suspended in 200 ml. of sterile water, previously inoculated with lactobacilli and the culture allowed to solidify.

It will be apparent from the foregoing that a composition of matter has been described which has the very distinctive, new and unusual property of being soluble in cold water, that is water below the temperature at which agar is rehydratable to form a hydrogel microbiological medium of desired rigidity. While the basic constituents of this invention have been known for many years, and the desirability of such a composition of matter is readily apparent, it has not heretofore been suggested that such a composition of matter, having these valuable properties, is possible. While it is known in the prior art that agar-agar has many disadvantages as a gelling agent for microbiological purposes, it has not been suggested that it may be entirely replaced. For example, Wenck Patent No. 2,358,549 clearly recognized the disadvantages of agar and suggested that the amount of agar in a hydrogel may be reduced to some extent by using a water soluble cellulose derivative to reduce the amount of agar in the hydrogel. Wenck, however, in common with the entire profession before and after him, did not recognize that a hydrogel microbiological medium could be produced using entirely a water soluble cellulose derivative. Indeed, Wenck, and the profession generally, maintained one of the most important disadvantages of agar in their compositions, that is, the requirement that the microbiological medium be formed by heating the aqueous phase with the gelling agent. It is this important disadvantage, among others, to which the invention is directed and it is this problem which has existed for many years which is solved by the present invention.

Other disadvantages of using such conventional gelling agents as agar, inorganic silicates, and the gelling agents of the prior art, are also overcome by this invention. The composition of matter of this invention may, in general, be used without the revision of the entire culturing techniques as is commonly the disadvantage in changing gelling agents.

While it is believed that it is the property of the composition of matter which forms a more important part of this invention, the processes of preparation and use are also new and, as a result of these properties, drastically simplified from the processes of the prior art.

The technological, economic, and humanitarian advance of this invention is well illustrated by the application of the phenlyketonuria test previously described. However, the invention is not limited to this test but will make possible a host of tests which may be performed quickly, efficiently, and reliably, by persons with only minimal training and with little or no specialized equipment in areas of the world where such tests have heretofore been impossible.

It should be pointed out that the substitution of one gelling agent for another for some purposes may present no problem, but in microbiological media the presence or absence of particular gelling agents may drastically change the biological properties of the media. Therefore, one may not simply substitute any gelling agent for any other gelling agent. None of the gelling agents used in the prior art, however, exhibit the highly important and unusual properties of the composition of matter of this invention.

The detrimental effect of agar in the composition of matter may be illustrated by the following example. The inventors prepared microbiological media including agar in combination with the gelling agents previously described. First, it is necessary to heat water containing agar in combination with the above gelling agents to approximately 100° C. in order to form a uniform homogeneous microbiological hydrogel. When an attempt was made to hydrate a substantially dry mixture of agar and one of the gelling agents in water at room temperature, or in cold water as defined herein, the product which resulted was a grainy, nonuniform, and unusable mixture apparently containing localized, swelled particles of agar. When the mixture of agar and a cold water soluble cellulose derivative, as previously described, was heated to approximately 100° C. in order to form a uniform hydrogel, the viability of heat sensitive microorganisms was destroyed. It is thus apparent that while a small amount of agar, if small enough, would probably not affect the composition of matter of this invention so long as it was not present in sufficient quantities to function as a gelling agent. A functional amount of agar should not be present.

The article of manufacture of this invention provides means for carrying out the process of use conveniently at any desired location. It is unnecessary, using the article of manufacture of this invention, to carry out the process aseptically and to provide sterile components as is presently the case. The technological advance and the economic and humanitarian benefit of this invention is apparent, particularly when it is considered that massive screening tests in remote areas of the world may now be possible which were heretofore impossible.

This invention has been disclosed with respect to certain preferred embodiments and various modifications and

---

[1] Standard Methods for the Examination of Water, Sewage and Industrial Wastes, 10th ed., 1955, A.P.H.A., A.W.W.A, and F.S.I.W.A.

We claim:
1. The process of producing, reconstituting and using a dehydrated microbiological medium to produce an inoculated hydrated gelled microbiological medium of desired rigidity consisting essentially of the steps of
providing a dehydrated composition of matter consisting essentially of a homogeneous intermixture of microbiological nutrients, dormant forms of chose microorganisms and as the sole gelling agent a modified cellulose of the formula

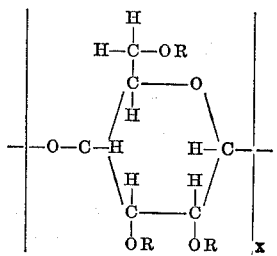

wherein R is a radical selected from the group consisting of carboxymethyl, hydroxyethyl, carboxymethyl-hydroxyethyl, alkali metal salts of carboxymethyl, hydroxyethyl and carboxymethyl-hydroxyethyl, and hydrogen,
providing a sterile aqueous phase,
mixing the sterile aqueous phase and the composition of matter while both are at approximately room temperature,
maintaining the mixture at approximately room temperature to produce an inoculated hydrated gelled microbiological medium,
placing a blood sample on the inoculated medium, and incubating said inoculated medium to cause the chosen mircoorganisms to yield a visible growth, in response to phenylalanine present in the blood sample.

2. The process of claim 1 including the step of including a coloring agent inert to the chosen microorganisms in the dehydrated microbiological medium to facilitate visual identification and growth recognition.

3. The process of producing and using a microbiological hydrogel medium of desired rigidity consisting essentially of the steps of
providing a dehydrated composition of matter consisting essentially of a homogeneous intermixture of microbiological nutrients and as the sole functional gelling agent a modified cellulose selected from the group consisting of carboxymethyl cellulose, hydroxyethyl cellulose, carboxymethyl-hydroxyethyl cellulose, alkali metal salts of carboxymethyl cellulose, alkali metal salts of hydroxyethyl cellulose, and alkali metal salts of carboxymethyl-hydroxyethyl cellulose,
providing an aqueous phase,
mixing the aqueous phase and the composition of matter while both are at a temperature less than the temperature required to hydrate agar,
inoculating the mixture with desired microorganisms, and
maintaining the mixture at a desired incubating temperature to provide a desired microbiological culture.

4. The process of claim 3 wherein the aqueous phase comprises milk.

5. The process of claim 3 wherein the aqueous phase comprises sewage.

6. The process of claim 3 wherein the aqueous phase comprises food.

7. The process of claim 3 wherein the aqueous phase includes soil components.

8. The process of claim 3 wherein the aqueous phase is sterile except as to desired microorganisms.

9. The process of claim 3 including the step of providing only desired dormant forms of microorganisms as a component of the composition of matter.

10. The process of claim 9 including the step of providing a coloring agent inert to the desired dormant forms of microorganisms as a component of the composition of matter.

11. The process of claim 3 including the step of providing a coloring agent inert to selected microorganisms as a component of the composition of matter.

12. The process of claim 3 including the steps of
including dormant forms of chosen microorganisms in the composition of matter,
maintaining the components approximately at room temperature to produce an inoculated microbiological hydrogel composition,
placing a desired biological sample in the inoculated medium, and
incubating the inoculated medium to cause the chosen microorganisms to yield a visible growth, in response to a component of the biological sample.

13. The process of claim 12 including the step of providing a coloring agent inert to the chosen microorganisms as a component of the composition of matter.

14. The process of claim 12 wherein the biological sample is selected from the group consisting of blood, water, sewage, milk, soil, swab test material obtained from a desired surface, and test material obtained from air.

15. The process of claim 3 wherein providing the composition of matter includes the following steps:
providing sterile water,
dissolving the nutrients in the sterile water,
dissolving the gelling agent in the sterile water, and
lyophilizing the solution to form the dehydrated composition of matter.

16. The process of claim 3 including the step of inoculating the composition of matter in the dehydrated state with dormant forms of chosen microorganisms for shipment or storage prior to mixing the composition of matter with the aqueous phase.

17. A dry composition of matter having as its distinctive characteristic the property of being reconstitutable in cold water to form a clear microbiological hydrogel medium, consisting essentially of a homogeneous intermixture of microbiological nutrients and as the sole functional gelling agent a cold water soluble modified cellulose selected from the group consisting of carboxymethyl cellulose, hydroxyethyl cellulose, carboxymethyl-hydroxyethyl cellulose, alkali metal salts of carboxymethyl cellulose, alkali metal salts of hydroxyethyl cellulose, and akali metal salts of carboxymethyl-hydroxyethyl cellulose.

18. The composition of matter of claim 17 further including dormant forms of chosen microorganisms and a coloring agent inert to the chosen microorganisms.

19. The composition of matter of claim 17 further including pure strains of selected bacteria, for use in producing a starter culture for desired processes and a coloring agent inert to the selected bacteria.

20. The composition of matter of claim 19 wherein the pure strain of bacteria is *Streptococcus thermophilus*.

21. The composition of matter of claim 17 further including *Bacillus subtilis* in a domant form and a coloring agent inert to the bacteria.

22. A microbiological testing kit comprising:
a first container,
a dry composition of matter within the first container having as its distinctive characteristic the property of being reconstitutable in cold water to form a clear microbiological hydrogel medium, consisting essentially of a homogeneous intermixture of microbiological nutrients and as the sole functional gelling agent a cold water soluble modified cellulose selected from the group consisting of carboxymethyl cellulose, hydroxyethyl cellulose, carboxymethyl-hydroxyethyl cellulose, alkali metal salts of carboxymethyl cellulose, alkali metal salts of hydroxyethyl cellulose, and alkali metal salts of carboxymethyl-hydroxyethyl cellulose, a second container, means securing the second container to the first container in normally noncommunicating relationship therewith, said means being selectively openable to provide communication between the first and second containers, and an aqueous phase of desired composition in the second container whereby when the securing means is opened the aqueous phase and the composition of matter are mixed to form a microbiological hydrogel medium.

23. The invention of claim 22 wherein the composition of matter further includes dormant forms of chosen microorganisms and a coloring agent inert to the chosen microorganisms.

24. The invention of claim 22 further including a coloring agent inert to selected microorganisms for facilitating visual identification and growth recognition in the hydrogel medium.

25. The process of claim 3 wherein the aqueous phase includes a member selected from the group consisting of swab test components and air sample components.

26. The process of producing and utilizing a microbiological hydrogel medium of desired rigidity consisting essentially of the steps of:

providing a dehydrated composition of matter consisting essentially of a homogeneous intermixture of microbiological nutrients and as the sole functional gelling agent a modified cellulose selected from the group consisting of carboxymethyl cellulose, hydroxyethyl cellulose, carboxymethyl-hydroxyethyl cellulose, alkali metal salts of carboxymethyl cellulose, alkali metal salts of hydroxyethyl cellulose, and akali metal salts of carboxymethyl-hydroxyethyl cellulose;

providing an aqueous phase which includes a member selected from the group consisting of serum, blood, and spinal fluid;

mixing the aqueous phase and the composition of matter while both are at a temperature less than the temperature required to hydrate agar;

inoculating the mixture with a desired microorganism; and maintaining the mixture at a desired incubating temperature to provide a desired microbiological culture.

References Cited

UNITED STATES PATENTS

| | | | |
|---|---|---|---|
| 2,358,549 | 9/1944 | Wenck | 195—100 |
| 2,689,204 | 9/1954 | Nickerson | 195—100 |
| 2,710,810 | 6/1955 | Strashun | 99—98 X |
| 2,839,526 | 6/1958 | Miller | 99—136 X |
| 2,910,410 | 10/1959 | Corman | 195—100 X |
| 3,036,894 | 5/1962 | Forestiere | 23—253 X |
| 3,067,109 | 12/1962 | Baron. | |
| 3,115,404 | 12/1963 | Casney | 195—100 X |
| 3,168,796 | 2/1965 | Scott et al. | |

ALVIN E. TANENHOLTZ, *Primary Examiner.*